UNITED STATES PATENT OFFICE.

HENRY W. JOHNS, OF NEW YORK, N. Y.

FIREPROOFING COMPOUND.

SPECIFICATION forming part of Letters Patent No. 441,164, dated November 25, 1890.

Application filed January 7, 1890. Serial No. 336,196. (Specimens.)

*To all whom it may concern:*

Be it known that I, HENRY W. JOHNS, a citizen of the United States, and a resident of New York city, in the county of New York and State of New York, have invented certain new and useful Improvements in Fireproofing Compounds, of which the following is a specification.

My invention relates to a new and useful compound for fireproofing inflammable or combustible materials, fabrics, or articles; and it consists in the composition of matter hereinafter described.

My compound is, as I have found, superior to any other for similar purposes in effectiveness and permanency. It does not crystallize or liquefy under exposure to heat as silicate of soda and most other salts do. It has in some forms an adhesive or cementing quality, and it may be made of any desired consistency, so that it may be applied to the articles desired to fire-proof in the form either of a solution, a paint, or a plastic coating or mortar. It may also be used as a component part of an oil-paint, or other water-proof coating or cement, which is thereby rendered less liable to take fire.

My compound may be put up ready for use in suitable packages either in a liquid or semi-liquid form, or in the form of a homogeneous plastic mass.

To make my improved fireproofing compound, I mix together borax and boracic acid with oxide of zinc. The presence of the zinc gives the compound an adhesive quality, whereby it is rendered more useful as a fireproof compound. The borax and boracic acid are combined, preferably, in about equal parts, the boracic acid being preferably dissolved in a solution of the borax. The quantity of zinc employed will depend upon the desired degree of consistence and adhesiveness of the compound.

My said fire-proof compound may be used in liquid form either to saturate or to brush over the articles to be fireproofed. It may be also mixed with fire-proof material—such as asbestus—which I prefer to finely divide or powder before admixture with the other materials. Other non-combustible substances—such as infusorial earth, chalk, clay, and other similar bodies—may be used thus. My fireproofing material may be made to assume the form of a more or less thin paste or paint like material which can be applied as an exterior coating to the article to be fireproofed.

Other material besides the oxide of zinc may be employed to give an adhesive or tenacious quality to the fireproofing material; but I prefer oxide of zinc.

Having described my invention, I claim—

1. The above-described fireproofing compound, composed, essentially, of borax and boracic acid and the oxide of zinc.

2. The above-described fireproofing compound, composed, essentially, of borax and boracic acid and a thickening substance, substantially as set forth.

Signed at New York, in the county of New York and State of New York, this 2d day of January, A. D. 1890.

HENRY W. JOHNS.

Witnesses:
   PHILLIPS ABBOTT,
   S. D. CHAPMAN.